US012661638B2

(12) United States Patent
Zhu et al.

(10) Patent No.: US 12,661,638 B2
(45) Date of Patent: Jun. 23, 2026

(54) SUPPORTED COPPER-BASED SINGLE-ATOM CATALYST AND PREPARATION METHOD AND USE THEREOF

(71) Applicant: INSTITUTE OF PROCESS ENGINEERING, CAS, Beijing (CN)

(72) Inventors: Tingyu Zhu, Beijing (CN); Xiaolong Liu, Beijing (CN); Haoyu Shi, Beijing (CN); Yang Zou, Beijing (CN)

(73) Assignee: Institute of Process Engineering, CAS, Beijing (CN)

( * ) Notice: Subject to any disclaimer, the term of this patent is extended or adjusted under 35 U.S.C. 154(b) by 532 days.

(21) Appl. No.: 18/140,702

(22) Filed: Apr. 28, 2023

(65) Prior Publication Data
US 2024/0207825 A1     Jun. 27, 2024

(30) Foreign Application Priority Data
Dec. 22, 2022     (CN) .......................... 202211653745.9

(51) Int. Cl.
B01J 23/72          (2006.01)
B01J 21/06          (2006.01)
(Continued)

(52) U.S. Cl.
CPC .............. B01J 23/72 (2013.01); B01J 21/063 (2013.01); B01J 23/10 (2013.01); B01J 27/24 (2013.01);
(Continued)

(58) Field of Classification Search
CPC ........ B01J 2531/16; B01J 23/72; B01J 23/10; B01J 21/00; B01J 23/83
See application file for complete search history.

(56) References Cited

U.S. PATENT DOCUMENTS

2021/0016256 A1*   1/2021   Liu .......................... B01J 23/72
2021/0163385 A1*   6/2021   Cavani ................... C07C 29/34

FOREIGN PATENT DOCUMENTS

CN     109908904 A  *  6/2019
CN     113501761 A  * 10/2021   .......... B01J 37/0018
(Continued)

OTHER PUBLICATIONS

English Translation of CN 109908904 (Year: 2019).*
(Continued)

*Primary Examiner* — Paul A Wartalowicz
*Assistant Examiner* — Slone Elizabeth Simkins
(74) *Attorney, Agent, or Firm* — Bay State IP, LLC

(57)          ABSTRACT

The present disclosure provides a supported copper-based single-atom catalyst and a preparation method and use thereof, belonging to the technical field of environmental catalysis. The preparation method includes the following steps: dispersing an organic ligand and a copper powder in acetonitrile, and conducting refluxing in a constant-temperature water bath to obtain a copper complex emulsion; conducting centrifugation and filtration on the copper complex emulsion in sequence to obtain a copper complex solution; mixing a support, the copper complex solution, and the acetonitrile, and conducting rotary evaporation on a resulting mixture to obtain a powder; and roasting the powder to obtain the supported copper-based single-atom catalyst. In the present disclosure, the copper powder is coordinated with the organic ligand and then supported on a surface of the support.

11 Claims, 1 Drawing Sheet

(51) Int. Cl.

| | |
|---|---|
| *B01J 23/10* | (2006.01) |
| *B01J 27/24* | (2006.01) |
| *B01J 31/18* | (2006.01) |
| *B01J 37/00* | (2006.01) |
| *B01J 37/02* | (2006.01) |
| *B01J 37/04* | (2006.01) |
| *B01J 37/08* | (2006.01) |

(52) U.S. Cl.
CPC ......... *B01J 31/1815* (2013.01); *B01J 37/009* (2013.01); *B01J 37/0209* (2013.01); *B01J 37/0213* (2013.01); *B01J 37/04* (2013.01); *B01J 37/08* (2013.01); *B01J 2231/70* (2013.01)

(56) References Cited

FOREIGN PATENT DOCUMENTS

| | | | | | |
|---|---|---|---|---|---|
| CN | 113634288 | A | * | 11/2021 | .............. B01J 23/75 |
| CN | 113782732 | A | * | 12/2021 | ........ H01M 10/0525 |
| CN | 114250482 | A | | 3/2022 | |
| CN | 114293223 | A | * | 4/2022 | |
| CN | 114621166 | A | * | 6/2022 | .......... B01J 31/1805 |
| CN | 114682283 | A | * | 7/2022 | .............. B01J 27/24 |
| CN | 114807991 | A | * | 7/2022 | .............. C25B 3/03 |
| CN | 115212882 | A | * | 10/2022 | .............. C25B 1/50 |
| CN | 115444965 | A | * | 12/2022 | ............. A61L 15/24 |
| CN | 116351476 | A | * | 6/2023 | .......... B01J 31/2404 |
| CN | 116809098 | A | * | 9/2023 | .............. B01J 27/24 |

OTHER PUBLICATIONS

English Translation of CN 113501761 (Year: 2021).*
English Translation of CN 114621166 (Year: 2022).*
English Translation of CN 114682283 (Year: 2022).*
English Translation of CN 116351476 (Year: 2023).*
English Translation of CN 116809098 (Year: 2023).*
English Translation of CN 113634288 (Year: 2021).*
English Translation of CN 113782732 (Year: 2021).*
English Translation of CN 114807991 (Year: 2022).*
English Translation of CN 115212882 (Year: 2022).*
English Translation of CN 115444965 (Year: 2022).*
English Translation of CN 114293223 (Year: 2022).*

* cited by examiner

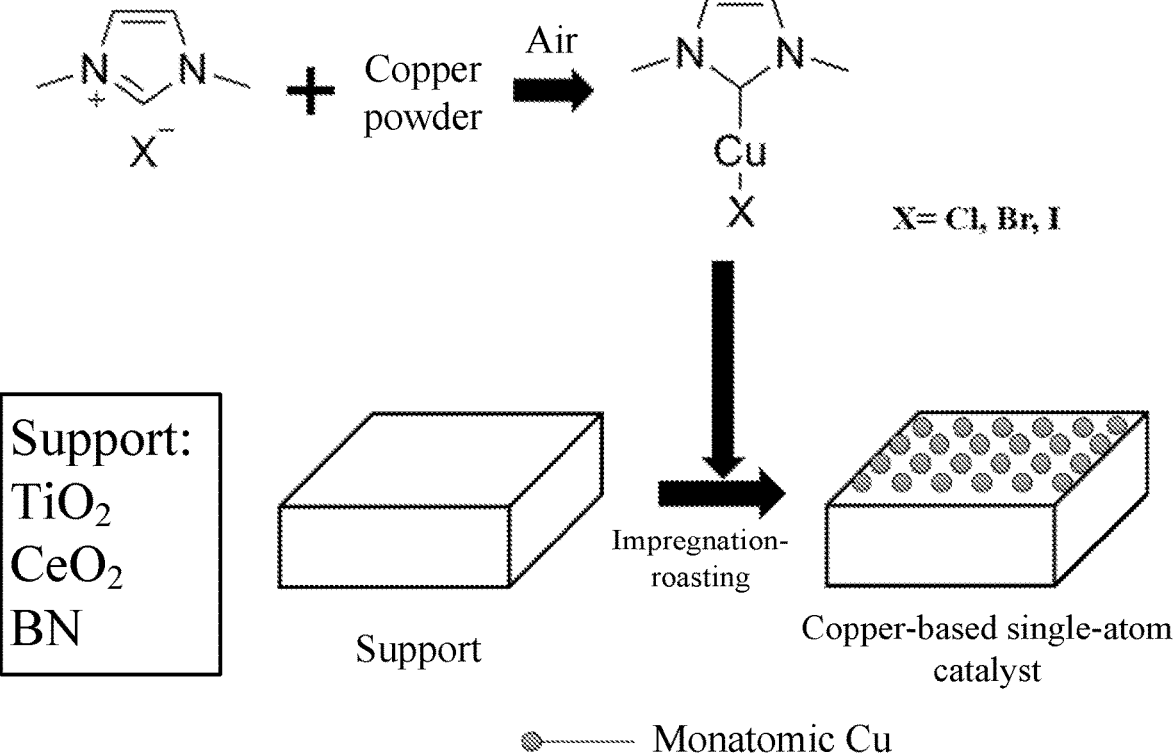

SUPPORTED COPPER-BASED SINGLE-ATOM CATALYST AND PREPARATION METHOD AND USE THEREOF

CROSS REFERENCE TO RELATED APPLICATION

This patent application claims the benefit and priority of Chinese Patent Application No. 202211653745.9, filed with the China National Intellectual Property Administration on Dec. 22, 2022, the disclosure of which is incorporated by reference herein in its entirety as part of the present application.

TECHNICAL FIELD

The present disclosure relates to the technical field of environmental catalysis, in particular to a supported copper-based single-atom catalyst and a preparation method and use thereof.

BACKGROUND

Carbon monoxide (CO) is a major air pollutant, which is harmful to human health and natural environment. The current mainstream carbon monoxide removal technology is catalytic oxidation, with catalysts as a core. At present, catalysts have been widely used in industries with high carbon monoxide emissions, such as automobile exhaust treatment, industrial flue gas treatment, and proton-exchange membrane fuel cells (PEMFCs).

Carbon monoxide oxidation is an important part in the field of environmental catalysis, which is of great significance to the study in catalyst structure-activity relationship to achieve industrial energy saving and emission reduction. Catalysts for carbon monoxide oxidation mainly include noble metal catalysts and non-noble metal catalysts. Noble metals mainly include Pt, Pd, Ru, and Au, while non-noble metals mainly focus on transition metals, such as Cu, Mn, and Fe.

With high reserves and low cost, the non-noble metals have attracted extensive attention in the field of catalysis. However, currently non-noble metals are easily deactivated by absorbing water on the surface due to poor water resistance, and have a low catalytic activity at low temperatures, resulting in temperatures generally being over 100° C. during carbon monoxide conversion. The directional modification and optimization of the catalyst can effectively improve a conversion rate of carbon monoxide and increase its application range; and modifying transition metal elements into single atoms can greatly improve their catalytic efficiency and durability.

CN114250482A disclosed a high-load copper single atom-based catalyst for electrocatalysis of carbon monoxide and a preparation method thereof. In the preparation method, a zinc salt, a copper salt, 2-methylimidazole, and dicyandiamide are reacted in solvents such as N,N-dimethylformamide to obtain a precursor; water is added to precipitate the precursor in organic compounds such as polyacrylonitrile; and a resulting precipitate is calcined under the protection of helium or the like to obtain the supported copper single atom-based catalyst. The catalyst has an excellent performance in electrochemically reducing carbon monoxide.

At present, methods for modifying copper into single-atom forms generally require relatively-complicated reaction steps, or have raw materials with a high cost. In order to meet the needs of actual production, it is urgent to find a method that can prepare copper-based single-atom catalysts through simple reactions and relatively cheap copper sources.

SUMMARY

An objective of the present disclosure is to provide a supported copper-based single-atom catalyst and a preparation method and use thereof. In the present disclosure, a copper-based single-atom catalyst can be prepared with a low-cost copper source through a simple reaction, and the catalyst has a desirable catalytic performance during low-temperature oxidation of carbon monoxide.

To achieve the above objective, the present disclosure provides the following technical solutions:

The present disclosure provides a preparation method of a supported copper-based single-atom catalyst, including the following steps:

dispersing an organic ligand and a copper powder in acetonitrile, and conducting refluxing in a constant-temperature water bath to obtain a copper complex emulsion;

conducting centrifugation and filtration on the copper complex emulsion in sequence to obtain a copper complex solution;

mixing a support, the copper complex solution, and the acetonitrile, and conducting rotary evaporation on a resulting mixture to obtain a powder; and roasting the powder to obtain the supported copper-based single-atom catalyst.

Preferably, the organic ligand is selected from the group consisting of 1,3-dimethylimidazolium chloride, 1,3-dimethylimidazolium iodide, and 1,3-dimethylimidazolium bromide.

Preferably, the support is selected from the group consisting of titanium dioxide, cerium oxide, and boron nitride.

Preferably, the titanium dioxide is titanium dioxide type P25, the cerium oxide is nano-cerium oxide, and the boron nitride is hexagonal boron nitride.

Preferably, the roasting is conducted at 300° C. for 4 h.

Preferably, the refluxing in a constant-temperature water bath is conducted at 60° C. to 70° C. for 12 h to 16 h.

Preferably, the organic ligand and the copper powder are at a molar ratio of 1:10.

The present disclosure further provides a supported copper-based single-atom catalyst prepared by the preparation method, including a support and copper single atoms supported on the support.

Preferably, 1 wt % to 2.4 wt % of the copper element is used.

The present disclosure further provides use of the supported copper-based single-atom catalyst in catalysis of carbon monoxide oxidation; where the carbon monoxide oxidation is conducted at 140° C. to 240° C.

The present disclosure provides a preparation method of a supported copper-based single-atom catalyst, including the following steps: dispersing an organic ligand and a copper powder in acetonitrile, and conducting refluxing in a constant-temperature water bath to obtain a copper complex emulsion; conducting centrifugation and filtration on the copper complex emulsion in sequence to obtain a copper complex solution; mixing a support, the copper complex solution, and the acetonitrile, and conducting rotary evaporation on a resulting mixture to obtain a powder; and roasting the powder to obtain the supported copper-based single-atom catalyst. In the present disclosure, the copper powder is coordinated with the organic ligand and then supported on a surface of the support. Compared with traditional catalysts, the supported copper-based single-atom catalyst can ensure that copper atoms exist in the form of single atoms, and make copper more dispersed on the surface of the support, thereby benefiting a catalyst activity. The preparation method is simple, and has an easily available copper source.

BRIEF DESCRIPTION OF THE DRAWINGS

FIG. 1 shows a schematic diagram of a preparation method of a supported copper-based single-atom catalyst of the present disclosure.

DETAILED DESCRIPTION OF THE EMBODIMENTS

The present disclosure provides a preparation method of a supported copper-based single-atom catalyst, including the following steps:

dispersing an organic ligand and a copper powder in acetonitrile, and conducting refluxing in a constant-temperature water bath to obtain a copper complex emulsion;

conducting centrifugation and filtration on the copper complex emulsion in sequence to obtain a copper complex solution;

mixing a support, the copper complex solution, and the acetonitrile, and conducting rotary evaporation on a resulting mixture to obtain a powder; and roasting the powder to obtain the supported copper-based single-atom catalyst.

In the present disclosure, unless otherwise specified, all raw materials used are commercially available products well known to those skilled in the art.

In the present disclosure, an organic ligand and a copper powder are dispersed in acetonitrile, and refluxing in a constant-temperature water bath is conducted to obtain a copper complex emulsion.

In the present disclosure, the organic ligand is preferably selected from the group consisting of 1,3-dimethylimidazolium chloride, 1,3-dimethylimidazolium iodide, and 1,3-dimethylimidazolium bromide.

In the present disclosure, the copper powder has a particle size of preferably 1 μm. The organic ligand and the copper powder are at a molar ratio of preferably 1:10. By controlling the molar ratio of the organic ligand and the copper powder in the above range, the copper powder is excessive relative to the organic ligand, thereby ensuring that the organic ligand can completely form the copper complex, and avoiding excessive copper powder increasing the difficulty of subsequent separation.

In the present disclosure, there is no special requirement on a dosage of the acetonitrile, as long as the organic ligand can be completely dissolved and the copper powder can be uniformly dispersed. The refluxing in a constant-temperature water bath is conducted at preferably 60° C. to 70° C., more preferably 65° C. for preferably 12 h to 16 h, more preferably 12 h. During the refluxing in a constant-temperature water bath, the organic ligand and a part of copper form the copper complex.

In the present disclosure, centrifugation and filtration are conducted on the copper complex emulsion in sequence to obtain a copper complex solution.

In the present disclosure, there is no special requirement on conditions of the centrifugation, as long as excess copper powder can be removed. The filtration is preferably silica gel filtration; excess copper powder is further removed by filtration to ensure that only the copper complex is contained in a complex solution.

In the present disclosure, a support, the copper complex solution, and the acetonitrile are mixed, and rotary evaporation is conducted on a resulting mixture to obtain a powder.

In the present disclosure, the support is preferably selected from the group consisting of titanium dioxide, cerium oxide, and boron nitride; the titanium dioxide is preferably titanium dioxide type P25, the cerium oxide is preferably nano-cerium oxide, and the boron nitride is preferably hexagonal boron nitride.

In the present disclosure, a dosage of the support is preferably determined according to a composition of the supported copper-based single-atom catalyst. The acetonitrile is added preferably enough to completely dissolve the copper complex and fully immerse the support.

In the present disclosure, the mixing is conducted preferably by heating in a water bath under stirring; the heating in a water bath is conducted at preferably 50° C. to 60° C. for preferably 2 h to 4 h. During the mixing, the copper complex solution is adsorbed onto the support.

In the present disclosure, the rotary evaporation is conducted at preferably 60° C.; there is no special requirement on a time of the rotary evaporation, as long as feed liquid in the mixture can be evaporated to dryness.

In the present disclosure, the powder is roasted to obtain the supported copper-based single-atom catalyst.

In the present disclosure, before the roasting, the powder is preferably further dried. There is no special requirement on conditions of the drying, and drying conditions well known in the art can be used.

In the present disclosure, the roasting is conducted at preferably 300° C. for preferably 4 h. During the roasting, the organic ligand in the copper complex is removed, and the catalyst can form a certain crystal form and porous structure, and a mechanical strength of the catalyst is improved.

The present disclosure further provides a supported copper-based single-atom catalyst prepared by the preparation method, including a support and copper single atoms supported on the support. Preferably 1 wt % to 2.4 wt % of the copper element is used.

The present disclosure further provides use of the supported copper-based single-atom catalyst in catalysis of carbon monoxide oxidation; where the carbon monoxide oxidation is conducted at 140° ° C. to 240° ° C.

In the present disclosure, there is no special requirement on conditions for the catalysis of carbon monoxide oxidation, and reaction conditions well known in the art can be used. There is no special requirement on a source of the carbon monoxide, and any flue gas containing carbon monoxide known in the art can be used. In the examples, a composition of the flue gas includes: [CO]=10,000 ppm, [$O_2$]=16 vol %, $N_2$ as carrier gas, with a catalyst dosage of 200 mg and a flue gas flow rate of 200 mL/h.

The supported copper-based single-atom catalyst and the preparation method and the use thereof provided by the present disclosure will be described in detail below with reference to examples, but these examples should not be construed as limiting the scope of the present disclosure.

Example 1

This example provided a supported copper-based single-atom catalyst, where based on a mass percentage of the supported copper-based single-atom catalyst as 100 wt %, the supported copper-based single-atom catalyst had 1 wt % of a copper element by mass percentage;

a preparation method of the supported copper-based single-atom catalyst was an impregnation method, as shown in FIG. 1, specifically including the following steps:

according to a molar ratio of 1:10, 1,3-dimethylimidazolium chloride and a copper powder were dispersed into acetonitrile, refluxed in a constant-temperature water bath at 65° C. for 12 h, and centrifuged 2 to 3 times, and a supernatant was filtered through a silica gel to obtain a copper complex solution; a titanium dioxide support was added to the copper complex solution, and acetonitrile was added to disperse the support in the acetonitrile, a mixture was heated under stirring in a water bath at 50° C. for 2 h, and the subjected to rotary evaporation at 60° C. to obtain a powder; and the powder was dried, and then roasted at 300° C. for 4 h to obtain the supported copper-based single-atom catalyst.

Example 2

This example provided a supported copper-based single-atom catalyst, where based on a mass percentage of the supported copper-based single-atom catalyst as 100 wt %, the supported copper-based single-atom catalyst had 1 wt % of a copper element by mass percentage;

A preparation method differed from that of Example 1 only in that the titanium dioxide support was replaced with a cerium oxide support.

Example 3

This example provided a supported copper-based single-atom catalyst, where based on a mass percentage of the supported copper-based single-atom catalyst as 100 wt %, the supported copper-based single-atom catalyst had 1 wt % of a copper element by mass percentage;

A preparation method differed from that of Example 1 only in that the titanium dioxide support was replaced with a boron nitride support.

Example 4

This example provided a supported copper-based single-atom catalyst, where based on a mass percentage of the supported copper-based single-atom catalyst as 100 wt %, the supported copper-based single-atom catalyst had 1 wt % of a copper element by mass percentage;

A preparation method differed from that of Example 1 only in that the organic ligand 1,3-dimethylimidazolium chloride was replaced with 1,3-dimethylimidazolium iodide.

Example 5

This example provided a supported copper-based single-atom catalyst, where based on a mass percentage of the supported copper-based single-atom catalyst as 100 wt %, the supported copper-based single-atom catalyst had 1 wt % of a copper element by mass percentage;

A preparation method differed from that of Example 1 only in that the 1,3-dimethylimidazolium chloride was replaced with 1,3-dimethylimidazolium iodide, and the titanium dioxide support was replaced with a cerium oxide support.

Example 6

This example provided a supported copper-based single-atom catalyst, where based on a mass percentage of the supported copper-based single-atom catalyst as 100 wt %, the supported copper-based single-atom catalyst had 1 wt % of a copper element by mass percentage;

A preparation method differed from that of Example 1 only in that the 1,3-dimethylimidazolium chloride was replaced with 1,3-dimethylimidazolium iodide, and the titanium dioxide support was replaced by a boron nitride support.

Comparative Example 1

This comparative example differed from Example 1 in that no organic ligand 1,3-dimethylimidazolium chloride was added, the copper source was replaced by copper nitrate, and the refluxing in a constant-temperature water bath and the centrifugation and filtration were not conducted. The other reaction conditions were the same as those in Example 1.

Comparative Example 2

This comparative example differed from Example 1 in that no organic ligand was added, the copper source was replaced by copper nitrate, and the refluxing in a constant-temperature water bath and the centrifugation and filtration were not conducted, and the support was replaced with cerium oxide. The other reaction conditions were the same as those in Example 1.

Comparative Example 3

This comparative example differed from Example 1 in that no precursor of the organic ligand was added, the copper source was replaced by copper nitrate, and the refluxing in a constant-temperature water bath and the centrifugation and filtration were not conducted, and the support was replaced with boron nitride. The other reaction conditions were the same as those in Example 1.

The catalysts obtained in Examples 1 to 6 and Comparative Examples 1 to 3 were subjected to a catalytic performance test:

Test conditions were as follows: a flue gas composition included: $[CO]=10,000$ ppm, $[O_2]=16$ vol %, $N_2$ as a carrier gas, with a catalyst dosage of 200 mg. The catalytic oxidation was conducted in an atmosphere with a reaction furnace temperature of 100° C. to 320° C. and a flue gas flow rate of 200 mL/h. The results of the catalytic oxidation of carbon monoxide were shown in Table 1.

TABLE 1

| Results of catalytic oxidation of carbon monoxide of examples and comparative examples | | |
| --- | --- | --- |
| | Maximum CO conversion rate | Reaction temperature for maximum conversion rate |
| Example 1 | 100% | 160° C. |
| Example 2 | 100% | 140° C. |
| Example 3 | 100% | 220° C. |
| Example 4 | 100% | 150° C. |
| Example 5 | 100% | 140° C. |
| Example 6 | 100% | 240° C. |
| Comparative Example 1 | 100% | 170° C. |

7

TABLE 1-continued

Results of catalytic oxidation of carbon monoxide
of examples and comparative examples

|  | Maximum CO conversion rate | Reaction temperature for maximum conversion rate |
|---|---|---|
| Comparative Example 2 | 97% | 150° C. |
| Comparative Example 3 | 95% | 300° C. |

It was seen from Table 1 that:

(1) In the present disclosure, the supported copper-based single-atom catalyst had an excellent CO oxidation performance; it was seen from Examples 1 to 6 that the supported copper-based single-atom catalyst could achieve an extremely-high CO conversion rate at low temperatures (140° C. to 240° C.);

(2) it was seen from Examples 1 and 4 and Comparative Example 1 that in the preparation process of the supported copper-based single-atom catalyst, the way of using the organic ligand to treat the copper source is obviously better than the way of untreated copper source.

In the present disclosure, single-atom copper loading is creatively realized. From Examples 2 and 5 and Comparative Example 2, it was seen that the activity of the copper-based single-atom catalyst was better than that of the copper oxide-supported catalyst formed from copper nitrate.

The above descriptions are merely preferred implementations of the present disclosure. It should be noted that a person of ordinary skill in the art may further make several improvements and modifications without departing from the principle of the present disclosure, but such improvements and modifications should be deemed as falling within the protection scope of the present disclosure.

What is claimed is:

1. A preparation method of a supported copper-based single-atom catalyst, comprising the following steps:

dispersing an organic ligand and a copper powder in acetonitrile, and subjecting a resulting dispersed system to refluxing in a constant-temperature water bath to obtain a copper complex emulsion;

conducting centrifugation and filtration on the copper complex emulsion in sequence to obtain a copper complex solution; and mixing a support, the copper complex solution, and acetonitrile, and conducting rotary evaporation on a resulting mixture to obtain a powder; and roasting the powder to obtain the supported copper-based single-atom catalyst,

wherein the organic ligand is selected from the group consisting of 1,3-dimethylimidazolium chloride, 1,3-dimethylimidazolium iodide, and 1,3-dimethylimidazolium bromide;

the support is selected from the group consisting of titanium dioxide, cerium oxide, and boron nitride;

the roasting is conducted at 300° C.; and the organic ligand and the copper powder are at a molar ratio of 1:10.

2. The preparation method according to claim 1, wherein the titanium dioxide is P25 titanium dioxide, the cerium oxide is nano-cerium oxide, and the boron nitride is hexagonal boron nitride.

3. The preparation method according to claim 1, wherein the roasting is conducted for 4 h.

4. The preparation method according to claim 1, wherein the refluxing in a constant-temperature water bath is conducted at 60° C. to 70° C. for 12 h to 16 h.

5. A supported copper-based single-atom catalyst prepared by the preparation method according to claim 1, comprising the support and copper single atoms supported on the support.

6. The supported copper-based single-atom catalyst according to claim 5, wherein the titanium dioxide is P25 titanium dioxide, the cerium oxide is nano-cerium oxide, and the boron nitride is hexagonal boron nitride.

7. The supported copper-based single-atom catalyst according to claim 5, wherein the roasting is conducted for 4 h.

8. The supported copper-based single-atom catalyst according to claim 5, wherein the refluxing in a constant-temperature water bath is conducted at 60° C. to 70° C. for 12 h to 16 h.

9. The supported copper-based single-atom catalyst according to claim 5, wherein based on a mass percentage of the supported copper-based single-atom catalyst being 100 wt %, the copper single atoms are in an amount of 1 wt % to 2.4 wt %.

10. A use method of the supported copper-based single-atom catalyst according to claim 5, comprising: in presence of the supported copper-based single-atom catalyst, conducting carbon monoxide oxidation between CO and $O_2$ at a temperature of 140° C. to 240° C.

11. The use method according to claim 10, wherein based on a mass percentage of the supported copper-based single-atom catalyst being 100 wt %, the copper single atoms are in an amount of 1 wt % to 2.4 wt %.

* * * * *